United States Patent
Wang et al.

(10) Patent No.: US 11,336,327 B2
(45) Date of Patent: May 17, 2022

(54) BASE STATION COORDINATION FOR CROSS-LINK INTERFERENCE CANCELATION

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/257,990

(22) PCT Filed: Mar. 10, 2020

(86) PCT No.: PCT/US2020/021840
§ 371 (c)(1),
(2) Date: Jan. 5, 2021

(87) PCT Pub. No.: WO2020/185748
PCT Pub. Date: Sep. 17, 2020

(65) Prior Publication Data
US 2021/0273676 A1 Sep. 2, 2021

Related U.S. Application Data (63) Continuation of application No. 16/355,640, filed on Mar. 15, 2019, now Pat. No. 10,797,749.

(51) Int. Cl.
*H04B 1/71* (2011.01)
*H04B 1/7107* (2011.01)
(Continued)

(52) U.S. Cl.
CPC ......... *H04B 1/7107* (2013.01); *H04B 1/0475* (2013.01); *H04B 7/0617* (2013.01);
(Continued)

(58) Field of Classification Search
CPC .. H04B 1/7107; H04B 1/0475; H04B 7/0617; H04B 7/024; H04L 1/0003; H04L 1/0026; H04W 16/10; H04J 11/0056
See application file for complete search history.

(56) References Cited

U.S. PATENT DOCUMENTS 10,797,749 B1    10/2020   Wang et al.
11,071,133 B2 *   7/2021   Bhattad ............. H04W 72/1273
(Continued)

FOREIGN PATENT DOCUMENTS

EP       2811674      12/2014
EP       2925065      11/2017
(Continued)

OTHER PUBLICATIONS

"Cross-Link Interference Management Based on Coordinated Beamforming", 3GPP TSG RAN WG1 Meeting NR#3, R1-1716036, Nagoya, Japan, Sep. 18-21, 2017, Sep. 2017, 12 pages.
(Continued)

*Primary Examiner* — Jean B Corrielus
(74) *Attorney, Agent, or Firm* — Colby Nipper PLLC (57) ABSTRACT

Techniques and apparatuses are described for enabling base stations (121, 122) to coordinate for canceling cross-link interference (380). The techniques and apparatuses described herein overcome challenges that a single base station (121) might otherwise face in trying to compensate a reception (131) by the base station (121) for cross-link interference (382) from a transmission (132) by another base station (122). The techniques and apparatuses described herein enable the base stations (121, 122) to form coordination sets to exchange information to enable the base stations (121, 122) to accurately reconstruct cross-link interference (380) and ultimately cancel the cross-link interference (380) to improve link quality.

20 Claims, 5 Drawing Sheets

Related U.S. Application Data (60) Provisional application No. 62/816,894, filed on Mar. 11, 2019.

(51) Int. Cl.
*H04L 1/00* (2006.01)
*H04B 1/04* (2006.01)
*H04B 7/06* (2006.01)
*H04W 16/10* (2009.01)

(52) U.S. Cl.
CPC .......... *H04L 1/0003* (2013.01); *H04L 1/0026* (2013.01); *H04W 16/10* (2013.01)

(56) References Cited

U.S. PATENT DOCUMENTS

| | | | |
|---|---|---|---|
| 2010/0220010 A1* | 9/2010 | Ko | H04B 7/0452 342/373 |
| 2012/0281657 A1 | 11/2012 | Ding et al. | |
| 2013/0259102 A1* | 10/2013 | Gudem | H04B 1/3805 375/219 |
| 2014/0185532 A1 | 7/2014 | Rao et al. | |
| 2014/0213269 A1 | 7/2014 | Nama et al. | |
| 2017/0273065 A1 | 9/2017 | Stirling-Gallacher | |
| 2017/0285130 A1 | 10/2017 | Kim et al. | |
| 2017/0289917 A1 | 10/2017 | Visotsky et al. | |
| 2018/0034575 A1 | 2/2018 | Das et al. | |
| 2018/0049190 A1 | 2/2018 | Abedini et al. | |
| 2018/0176855 A1* | 6/2018 | Liu | H04W 48/10 |
| 2018/0270835 A1 | 9/2018 | Chen et al. | |
| 2018/0279334 A1 | 9/2018 | Lim et al. | |
| 2018/0287739 A1 | 10/2018 | Kim et al. | |
| 2018/0323887 A1 | 11/2018 | Azarian Yazdi et al. | |
| 2019/0110335 A1 | 4/2019 | Zhang et al. | |
| 2019/0274155 A1* | 9/2019 | Bhattad | H04L 5/0073 |
| 2019/0363810 A1 | 11/2019 | Luo et al. | |
| 2019/0364449 A1* | 11/2019 | Yang | H04W 72/0446 |
| 2020/0112420 A1 | 4/2020 | Xu et al. | |
| 2020/0195310 A1* | 6/2020 | Abedini | H04B 7/026 |
| 2020/0295800 A1 | 9/2020 | Wang et al. | |
| 2020/0396621 A1 | 12/2020 | Park et al. | |
| 2021/0127311 A1* | 4/2021 | Jin | H04W 4/70 |
| 2021/0266889 A1* | 8/2021 | Akoum | H04B 7/0695 |
| 2021/0297128 A1* | 9/2021 | Badic | G01S 19/01 |
| 2021/0298035 A1* | 9/2021 | Moriwaki | H04W 72/082 |
| 2021/0314963 A1* | 10/2021 | Sharma | H04L 5/006 |

FOREIGN PATENT DOCUMENTS

| | | |
|---|---|---|
| WO | 2015021628 | 2/2015 |
| WO | 2018223386 | 12/2018 |
| WO | 2020061724 | 4/2020 |
| WO | 2020185748 | 9/2020 |

OTHER PUBLICATIONS

"Final Office Action", U.S. Appl. No. 16/355,640, dated Jan. 31, 2020, 11 Pages.
"International Search Report and Written Opinion", Application No. PCT/US2020/021840, dated Aug. 10, 2020, 21 pages.
"Invitation to Pay Additional Fees", PCT Application No. PCT/US2020/021840, dated Jun. 18, 2020, 12 pages.
"Notice of Allowance", U.S. Appl. No. 16/355,640, dated Jun. 5, 2020, 9 Pages.
"Pre-Interview Communication", U.S. Appl. No. 16/355,640, dated Oct. 22, 2019, 3 Pages.
Hoymann, et al., "Distributed Uplink Signal Processing of Cooperating Base Stations based on IQ Sample Exchange", Jul. 2009, 5 pages.
"Feedback information for downlink coordinated scheduling/beamforming", 3GPP TSG RAN WG1 Meeting #59—R1-094792, Nov. 2009, 7 pages.
"International Preliminary Report on Patentability", Application No. PCT/US2020/021840, dated Aug. 25, 2021, 13 pages.
MacCartney, et al., "Millimeter-Wave Base Station Diversity for 5G Coordinated Multipoint (CoMP) Applications", Jul. 2019, pp. 3395-3410.

* cited by examiner

BASE STATION COORDINATION FOR CROSS-LINK INTERFERENCE CANCELATION

BACKGROUND

Generally, a provider of a wireless network manages wireless communications over the wireless network. For example, a base station manages a wireless connection with user equipment (UE) that is connected to the wireless network. The base station determines configurations for the wireless connection, such as bandwidth and timing for the wireless connection.

The link quality between the UE and the base station can be degraded due to several factors, such as loss in signal strength, interfering signals, and so forth. For example, a downlink or uplink can cause co-channel interference in another communication link (cross-link interference). Several solutions have been developed to improve link quality. However, with recent advancements in wireless communication systems, such as Fifth Generation New Radio (5G NR), new approaches may be available.

SUMMARY

This document describes techniques and apparatuses for enabling base stations to coordinate for canceling cross-link interference by forming so-called "base-station coordination sets". The techniques and apparatuses described herein overcome challenges that a single base station might otherwise face in trying to independently compensate for cross-link interference to a reception. In the described techniques a base station of a coordination set can exchange information with another base station of the coordination set to accurately reconstruct interfering signals and cancel cross-link interference caused by transmissions at the other base station. In some cases, the base stations may apply similar techniques to cancel cross-link interference experienced by the UEs.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of base station coordination for cross-link interference cancelation are described below. The use of the same reference numbers in different instances in the description and the figures indicate similar elements.

DETAILED DESCRIPTION

Overview

In conventional wireless communication systems, a radio frequency (RF) signal quality (link quality) between a user equipment (UE) and a base station can degrade due to several factors, including signal interference or distance between the UE and the base station. The signal degradation may result in slower and less efficient data transmissions.

A type of interference, referred to as "cross-link interference," occurs when one base station or UE uses a set of air interface resources for a downlink at the same time a second base station or second UE uses at least a subset of those same air interface resources for an uplink. Cross-link interference can be particularly strong between neighboring base stations, or between base stations that share a direct line of sight between them, including orbiting base stations and high-altitude platform stations. Base stations dynamically reallocate resources to handle changing demands and conditions on a network. As a result, two base stations may grant intersecting air interface resources which may result in signals from a downlink transmission by one base station causing cross-link interference to an uplink reception at a different base station.

Multiple base stations can implement the described techniques to form a base-station coordination set to share information to model potential cross-link interference between base stations within the base-station coordination set. The base stations can account for the interference coming from transmissions at the other base stations of the coordination set, to reduce cross-link interference on receptions from UEs.

The information shared between base stations of a base-station coordination set may include I/Q (in-phase and quadrature amplitude modulation) data indicative of signal characteristics (amplitude, phase, etc.) of at least part of a transmission. For example, a first base station may use I/Q data received from a second base station of a coordination set to reconstruct potential cross-link interference to an uplink from a first UE to the first base station that is attributed to a downlink transmission of the I/Q data from the second base station to a second UE. The first base station may use the I/Q data to construct a filter to use to subtract the potential cross-link interference (caused by the second base station) during the reception of the uplink from the first UE.

The information shared between the base stations of a coordination set may additionally or alternatively include scheduling data to aid in cross-link interference reconstruction and cancelation. Scheduling data may indicate MIMO (Multiple Input Multiple Output) modes and modulation modes at different points in time for the transmissions at the base-station coordination set. The scheduling data may indicate precise timing of transmissions within the base-station coordination set, which may optionally include transmissions that have occurred in the past, as well as future transmissions that have yet to occur. The base station may adjust frequency, beam configuration, or timing of future uplinks to account for potential cross-link interference from future downlinks from other base stations in the base-station coordination set.

The base stations of a coordination set may share other information to enable the base stations to model potential cross-link interference. For example, the base stations may exchange locations of UEs as well as transmit and receive signal powers of the UEs.

In some cases, the base stations may coordinate to jointly schedule their uplinks and downlinks to reduce crosslink interference. For example, the base stations may avoid using intersecting air interface resources when potential cross-link interference is greater than a threshold, and allocate intersecting air interface resources when the potential cross-link interference is lower than the threshold. In another example, either or both base stations may change a beamforming configuration with either or both of the UEs to cancel cross-link interference.

By sharing scheduling data, I/Q data, beamforming data, and/or other data, the base stations that perform the described techniques can determine cross-link interference attributed to other transmissions from the coordination set. As a result of having more-accurate information about transmissions, base stations within the coordination set can more effectively cancel or reduce the cross-link interference to received signals, improve link quality, and network efficiency.

In some instances, a base station may apply a filter to cancel cross-link interference modeled from the I/Q data, scheduling data, beamforming data, or other data received from another base station. For example, a first base station may reconstruct cross-link interference coming from a transmission at a second base station using information the first base station obtains from the second base station. The first base station may subtract the reconstructed interference from the demodulated signals received on the uplink from the first UE.

As another example, base stations in a coordination set can adjust receiver algorithms executed by the base stations to decrease cross-link interference. For instance, a first base station may use scheduling information from a second base station to switch from using a Gaussian interference estimation calculation to non-Gaussian interference estimation that accounts for potential interference that may occur based on the scheduling of air interface resources by the base stations in the base-station coordination set.

In aspects, a method performed by a first base station of a base-station coordination set to cancel cross-link interference in coordination with a second base station of the base-station coordination set is disclosed. The method includes receiving, by the first base station and from the second base station, information about a downlink transmission from the second base station to a second user equipment (UE); based on the received information, modeling cross-link interference from the downlink transmission by the second base station to a reception of an uplink transmission by a first UE to the first base station; receiving, by the first base station, the uplink transmission from the first UE; and based on the modeling of the cross-link interference, canceling, by the first base station, the cross-link interference to the received uplink transmission from the first UE.

In aspects, a first base station is disclosed that includes a radio-frequency transceiver coupled to a processor and memory system. The processor and memory system include instructions that are executable by the processor to configure the first base station to cancel cross-link interference in coordination with a second base station. The instructions are executable to configure the first base station to receive, from another base station and using an inter-base station interface, information about a downlink transmission from the other base station to a second user equipment (UE); based on the received information, model cross-link interference from the downlink transmission by the other base station to a reception of an uplink transmission from a first UE to the base station; receive the uplink transmission from the first UE using the RF receiver; and using the model of the cross-link interference, cancel the cross-link interference to the received uplink transmission from the first UE.

Example Environments

Figure 1:
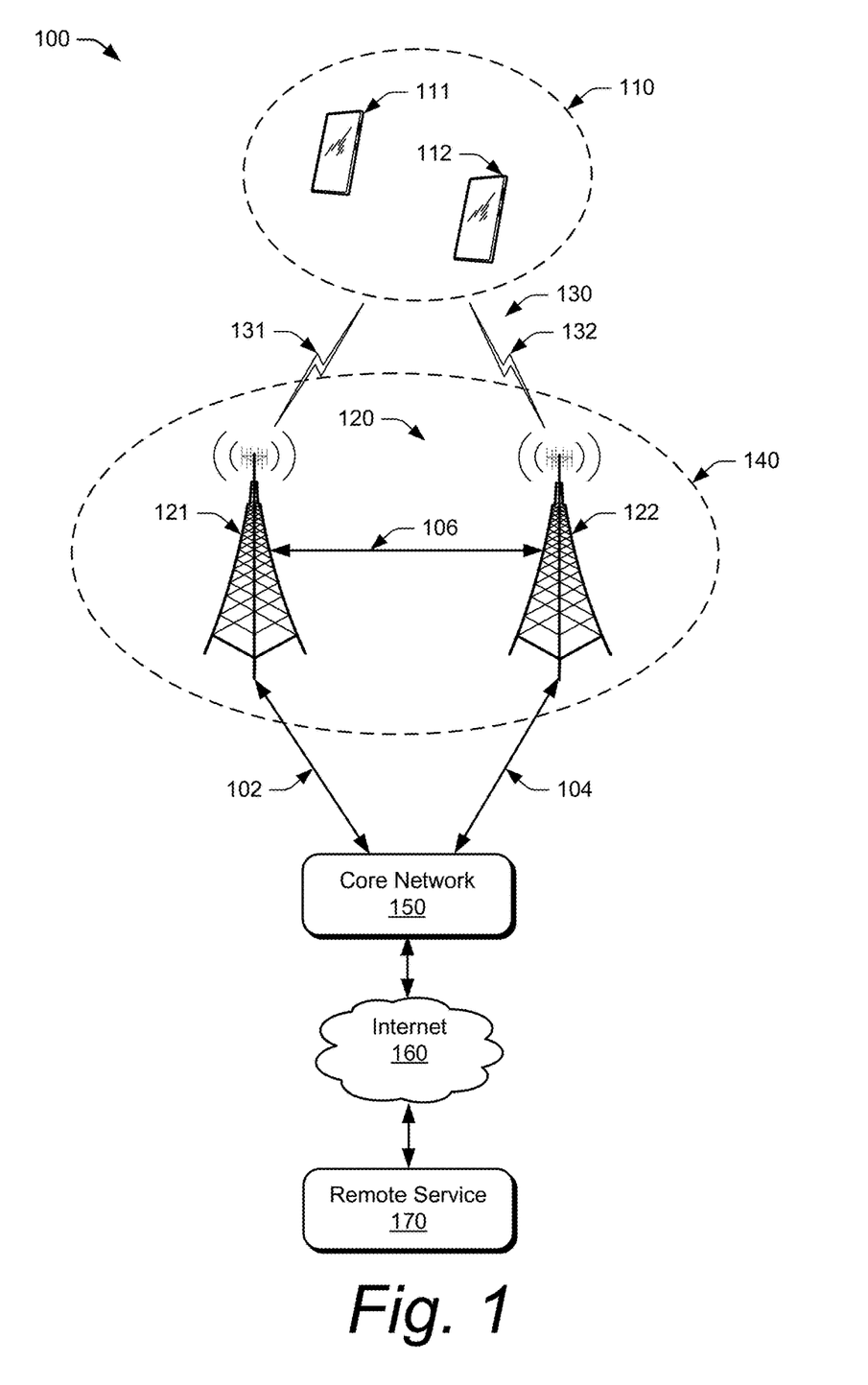
FIG. 1 illustrates an example operating environment in which base stations can coordinate to perform cross-link interference cancelation.

FIG. 1 illustrates an example operating environment in which base stations can coordinate to perform cross-link interference cancelation. FIG. 1 illustrates an example environment 100 which includes multiple user equipment 110 (UE 110) (illustrated as UE 111 and UE 112) that can communicate with base stations 120 (illustrated as base stations 121 and 122) through wireless communication links 130 (wireless link 130), illustrated as wireless links 131 and 132. For simplicity, the UE 110 is implemented as a smartphone but may be implemented as any suitable computing or electronic device, such as a smart watch, a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 collectively form a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network or using an S1 interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at a link 106, to exchange user-plane and control-plane data. Link 106 may be a wireline link, or a wireless link, such as a millimeter wave (mmWave) link, a sub-millimeter wave (sub-mmWave) link, or a free space optical (FSO) link. The UEs 110 may connect, via the core network 150, to public networks, such as the Internet 160 to interact with a remote service 170.

The base stations 121 and 122 are configured to share information to coordinate and cancel cross-link interference in the wireless links 131 and 132. For example, the UE 112 may receive data on a downlink from the base station 122 over the wireless link 132 and the UE 111 may simultaneously transmit data on an uplink to the base station 121 over the wireless link 131. When air interface resources for the wireless links 131 and 132 intersect, the downlink transmission of the wireless link 132 may cause interference to the reception of the uplink of the wireless link 131, causing reduced link quality. If unexpected cross-link interference from the wireless link 132 far exceeds other interference expected by the base station 121, the reception of the uplink from the UE 111 may become degraded.

To reduce interference originating from the downlink transmission of wireless link 132 to the uplink reception of wireless link 131, the base stations 121 and 122 may share information to coordinate and enable each to cancel the cross-link interference to the uplink reception of the wireless link 131. For example, the base station 122 may share information over the Xn interface at link 106 with base station 121, such as scheduling data, including information about transmissions on the wireless link 132. The base station 122 may send I/Q data associated with the transmission to the base station 121. Based on the I/Q data, the base station 121 may model interference to the uplink reception of wireless link 131 coming from the downlink transmission of wireless link 132. During the reception of the uplink from the UE 111, the base station 121 may apply compensation to cancel the cross-link interference caused by the downlink transmission from the base station 122. In this way, the base station 121 reduces the cross-link interference to the reception of the uplink from the UE 111 to improve the reliability of, and reduce errors in, the reception of the uplink from UE 111.

The base stations 121 and 122 may further coordinate to reduce cross-link interference between the UEs 111 and 112. The base stations 121 and 122 may use the information shared between the base stations 121 and 122 to synchronize an uplink from the UE 111 to the base station 121 with a downlink from the base station 122 to the UE 112 to reduce cross-link interference. For example, based on the scheduling data received from the base station 122, the base station 121 may allocate the same air interface resources for an uplink from the UE 111 to the base station 121 that the base station 122 allocates for a downlink to the UE 112, to a time period when the uplink and downlink transmissions do not have the potential to create cross-link interference. Alternatively, the base station 121 may allocate different air interface resources for an uplink from the UE 111 to the base station 121 than the base station 122 allocates for a downlink to the UE 112 from the base station 122, to a time period when the uplink and downlink would otherwise have the potential to generate cross-link interference. In this way, less cross-link interference is generated resulting in more reliable and less error-prone communication over the wireless links 131 and 132.

Example Devices

Figure 2:
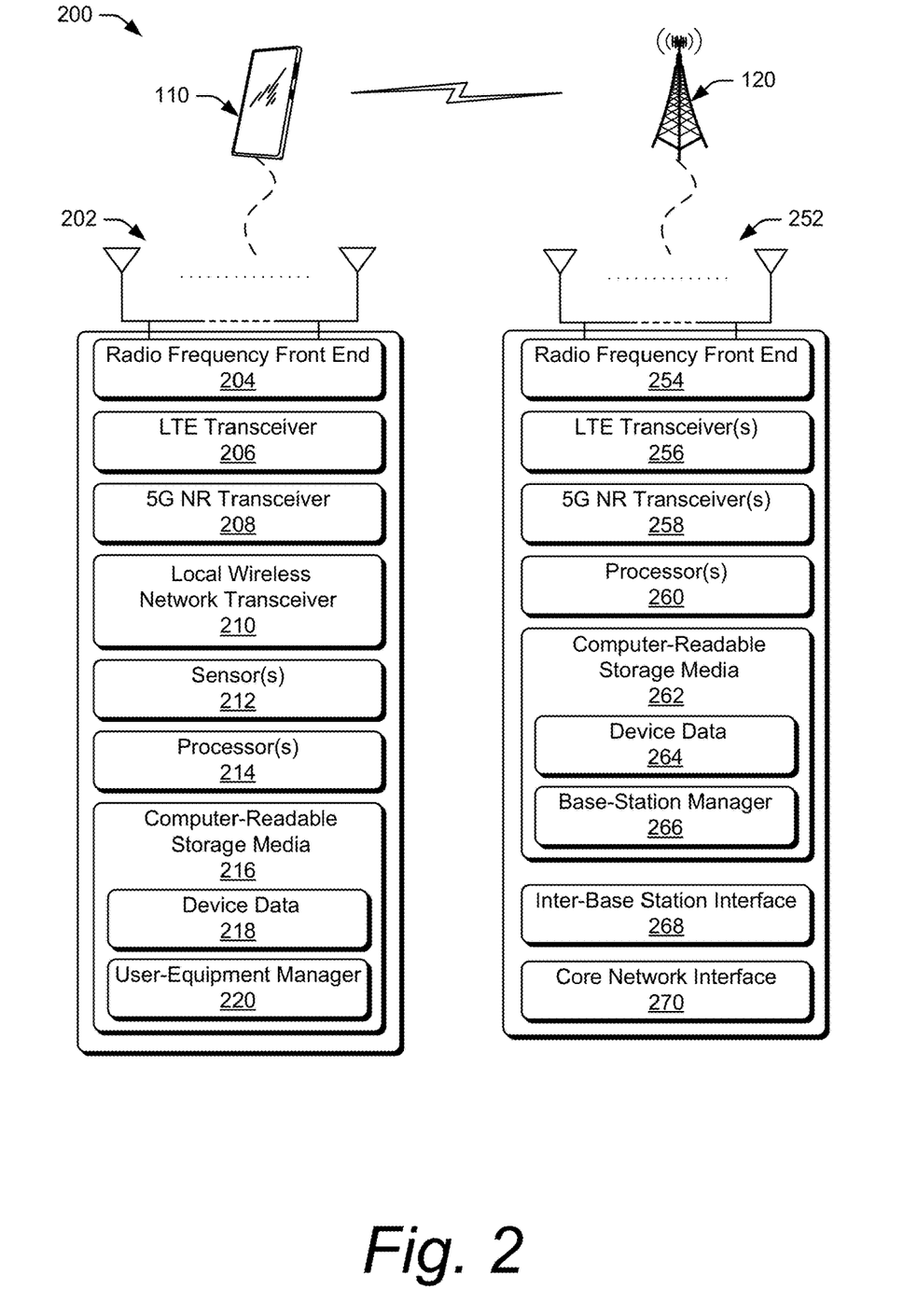
FIG. 2 illustrates an example device diagram that can implement various aspects of base station coordination for cross-link interference cancelation.

FIG. 2 illustrates an example device diagram that can implement various aspects of base station coordination for cross-link interference cancelation. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more local wireless networks (e.g., wireless local area network (WLAN), Bluetooth™, sonar, radar, lidar, Near Field Communication (NFC), a wireless personal area network (WPAN), Wi-Fi-Direct, IEEE 802.15.4, Zig-Bee, Thread, mmWave). The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in a UE-coordination set over a local wireless network.

The UE 110 includes sensor(s) 212 that can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a user-equipment manager 220. Alternately or additionally, the user-equipment manager 220 may be implemented in whole or part as hardware logic or circuitry integrated with or separate from other components of the UE 110. In at least some aspects, the user-equipment manager 220 configures the RF front end 204, the LTE transceiver 206, the 5G NR transceiver 208, and/or the local wireless network transceiver 210 to implement the techniques described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base-station manager 266. Alternately or additionally, the base-station manager 266 may be implemented in whole or part as hardware logic or circuitry integrated with or separate from other components of the base stations 120. In at least some aspects, the base-station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base-station manager 266 configures to exchange user-plane and control-plane data between another base station 120, to manage the communication of the base stations 120 with the UE 110. The base stations 120 include a core network interface 270 that the base-station manager 266 configures to exchange user-plane and control-plane data with core network functions and/or entities.

The base-station manager 266 is configured to coordinate with other base-station managers 266 to exchange information for canceling cross-link interference. A base-station manager 266 of the base station 121 may exchange data with the base station manager of the base station 122 using the inter-base station interface 268. The base station 121 may exchange I/Q data, scheduling information, beamforming information, or other data, with the base station 122 to determine whether a downlink from the base station 122 is at least partially responsible for cross-link interference on an uplink to the base station 121. The base-station managers 266 of the base stations 120 may exchange information about locations of the UEs 110 communicating on existing or future transmissions. The base-station managers 266 may exchange information about transmit and/or receive signal powers of the UEs 110 communicating on existing transmissions. The base-station managers 266 may exchange information about beamforming configurations used for transmissions and receptions by the base stations 120 in the base station coordination set and UEs 110 communicating with those base stations. With information from another base station, the base-station manager 266 more-accurately reconstructs interference to ultimately cancel the cross-link interference.

Example Implementations

Figure 3:
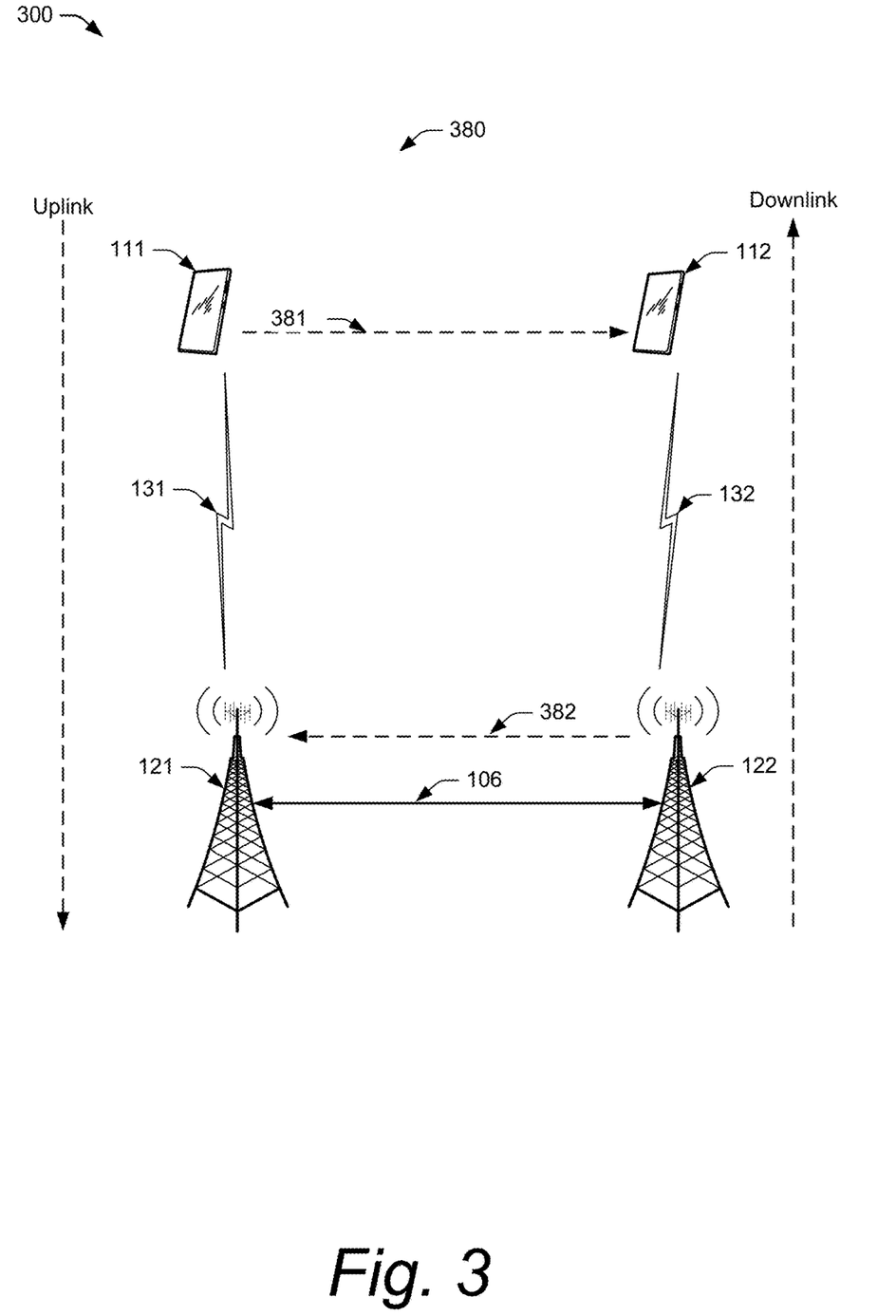
FIG. 3 illustrates an example implementation of base station coordination for cross-link interference cancelation.

FIG. 3 illustrates an example implementation of base station coordination for cross-link interference cancelation. As one example, FIG. 3 shows a system 300 including the UE 111 transmitting data on an uplink of the wireless link 131 to the base station 121 and the base station 122 transmitting data on a downlink of the wireless link 132 to the UE 112.

The wireless links 131 and 132 are susceptible to mutual cross-link interferences 380, including cross-link interferences 381 and 382. FIG. 3 shows that the downlink from the base station 122 may cause the crosslink interference 382 to the reception by the base station 121 of the uplink from the UE 111. The uplink from the UE 111 may cause the cross-link interference 381 to the reception by the UE 112 of the downlink from the base station 122.

The base stations 121 and 122 are configured to exchange data over the link 106, which may be wired or wireless, at least in part to perform coordinated techniques for cancelling the cross-link interferences 380. For example, the base station 121 is configured to receive via link 106, from the base station 122, I/Q data, scheduling information, location information, transmit signal power, or any other information about the downlink transmission on the wireless link 132 that enables the base station 121 to reconstruct the cross-link interference 382 in order to cancel the cross-link interference 382 during the reception of the uplink from the UE 111.

To cancel the cross-link interference 381 at the UE 112, the base station 121 and the base station 122 may coordinate and allocate air interface resources to the uplink from the UE 111 that differ from the air interface resources that are allocated to the downlink from the base station 122. For example, the base station 121 may communicate a revised resource allocation to the UE 111 to cancel the cross-link interference 381 to the reception of the downlink at the UE 112.

Example Procedures

Figure 4:
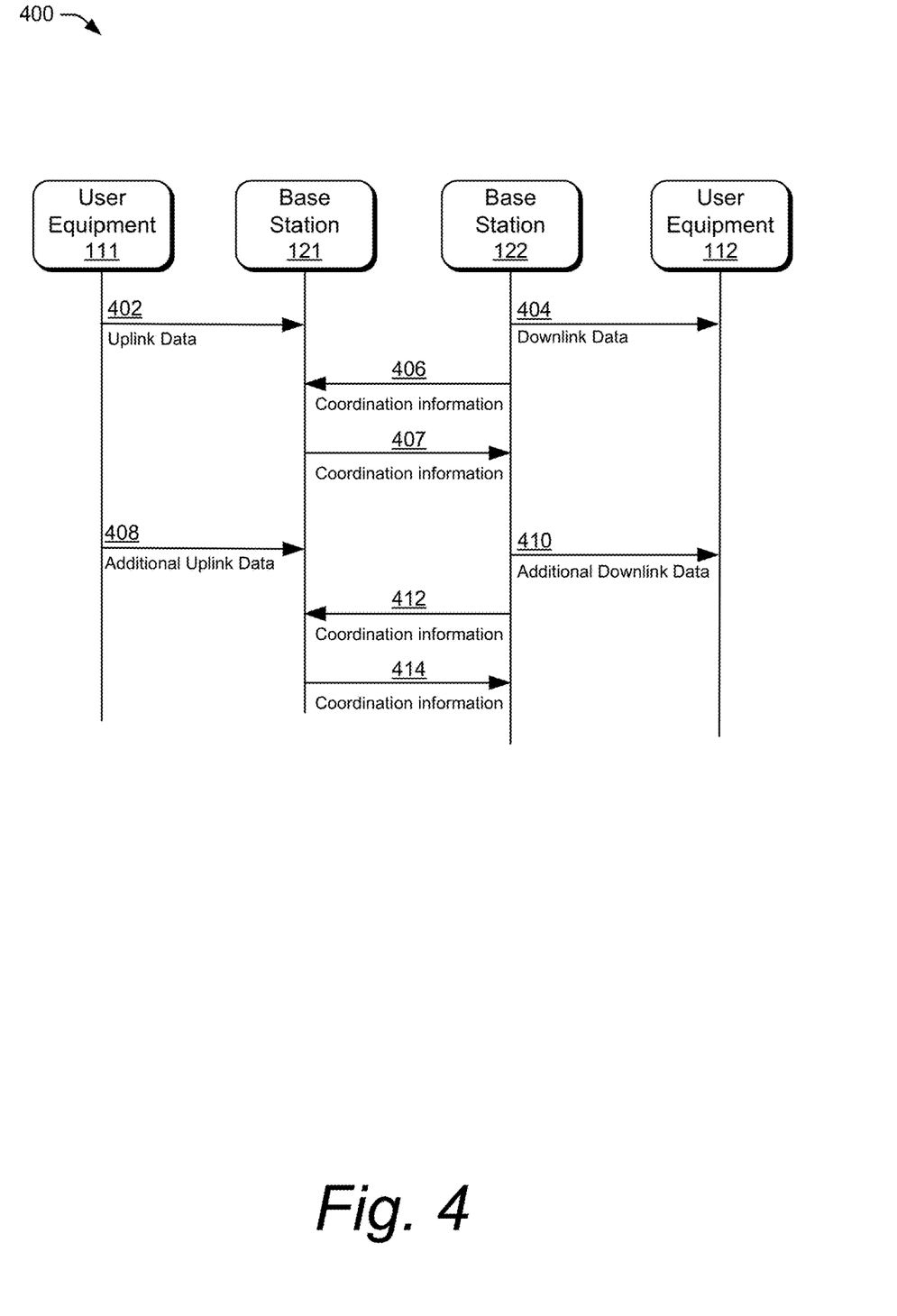
FIG. 4 illustrates a transaction diagram of devices implementing base station coordination for cross-link interference cancelation.

FIG. 4 illustrates a transaction diagram of devices implementing base station coordination for cross-link interference cancelation. The base stations 121 and 122 and the UEs 111 and 112 are the same base stations 121 and 122 and the same UEs 111 and 112, as previously described. FIG. 4 is described in the context of FIG. 3 where the UEs 111 and 112, and the base stations 121 and 122 are experiencing cross-link interference 380 from the wireless links 131 and 132.

At 402, the base station 121 receives data (uplink data) on an uplink of the wireless link 131 and at 404 the base station 122 transmits data (downlink data) over the wireless link 132. In cases where the base station 121 allocates at least some of the same time and frequency air interface resources for the uplink reception of the wireless link 131 that the base station 122 allocates for the downlink transmission over the wireless link 132, the downlink transmission on the wireless link 132 may generate cross-link interference 382 that can interfere with the uplink reception of the wireless link 131 by the base station 121. Similarly, the uplink from the UE 111 may generate cross-link interference 381 that can interfere with the reception of the downlink of the wireless link 132 by the UE 112.

At 406 and 407, the base station 121 and the base station 122 exchange coordination information for canceling the cross-link interference 380. For example, the base station 122 may send 406 I/Q data, scheduling information and/or beamforming configurations to the base station 121 indicative of a current or a future downlink transmission to the UE 112 over the wireless link 132. The base station 121 may likewise send 407 scheduling information and/or beamforming configurations for the UE 111 to the base station 122 indicative of a current or a future uplink reception from the UE 111 over the wireless link 131. From the scheduling information, the base station 121 can determine characteristics of the future transmissions from the base station 122 to the UE 112, model potential cross-link interference, and apply filters or otherwise cancel the cross-link interference 382 that is modeled to occur.

At 408, the UE 111 transmits additional uplink data on the uplink to the base station 121. The base station 121 cancels the cross-link interference 382 to the uplink, e.g., by applying a filter, changing a beamforming configuration of a receiver, or adjusting a receiver algorithm for the reception of the uplink from the UE 111.

At 410, the base station 122 transmits additional downlink data on the downlink to the UE 112. The base station 122 may adjust the scheduling of air interface resources for the downlink transmission to the UE 112 to avoid generating the cross-link interference 381, e.g., by moving the downlink to different air interface resources, changing a beamforming configuration, or otherwise adjusting the timing of the transmission to avoid the cross-link interference 381. As such, by coordinating, the base stations 121 and 122 may reduce the cross-link interferences 381 and 382 that might otherwise interfere with the reception of transmissions within the base station coordination set.

In the example of FIG. 4, the base station 121 may adjust a receiver algorithm used for receiving uplink data from the UE 111. For example, the base station 121 may apply a Gaussian interference estimation for the uplink from the UE 111 initially, and then determine a non-Gaussian interference estimation for the uplink from the UE 111 based on the I/Q data and/or schedule information contained in the coordination information received from the base station 122 at 406.

The base stations 121 and 122 may coordinate in advance of transmissions to model potential cross-link interference within the base station coordination set. For example, rather than be a reactive process, the base stations 121 and 122 perform a proactive process to anticipate cross-link interference and dynamically adjust transmissions and receptions to avoid creating cross-link interference.

At 412 and 414, the base stations 121 and 122 may continue to exchange coordination data to cancel cross-link interference that changes over time. For example, the base station 121 may receive 412, from the base station 122, updated coordination information about the downlink transmission by the base station 122 and use the updated information to model subsequent cross-link interference that is (or will soon be) affecting the reception of the uplink from the UE 111. The base stations 121 and 122 may dynamically adjust the scheduling of air interface resources for communications with the UEs 111 and 112 based on updated coordination information, to dynamically avoid generating potential cross-link interference. In a further example, the base station 121 may send 414 beamforming configuration information for the uplink between the UE 111 and the base station 121 that can be used by the base station 122 to change a beamforming configuration for the transmission of the downlink to the UE 112.

Figure 5:
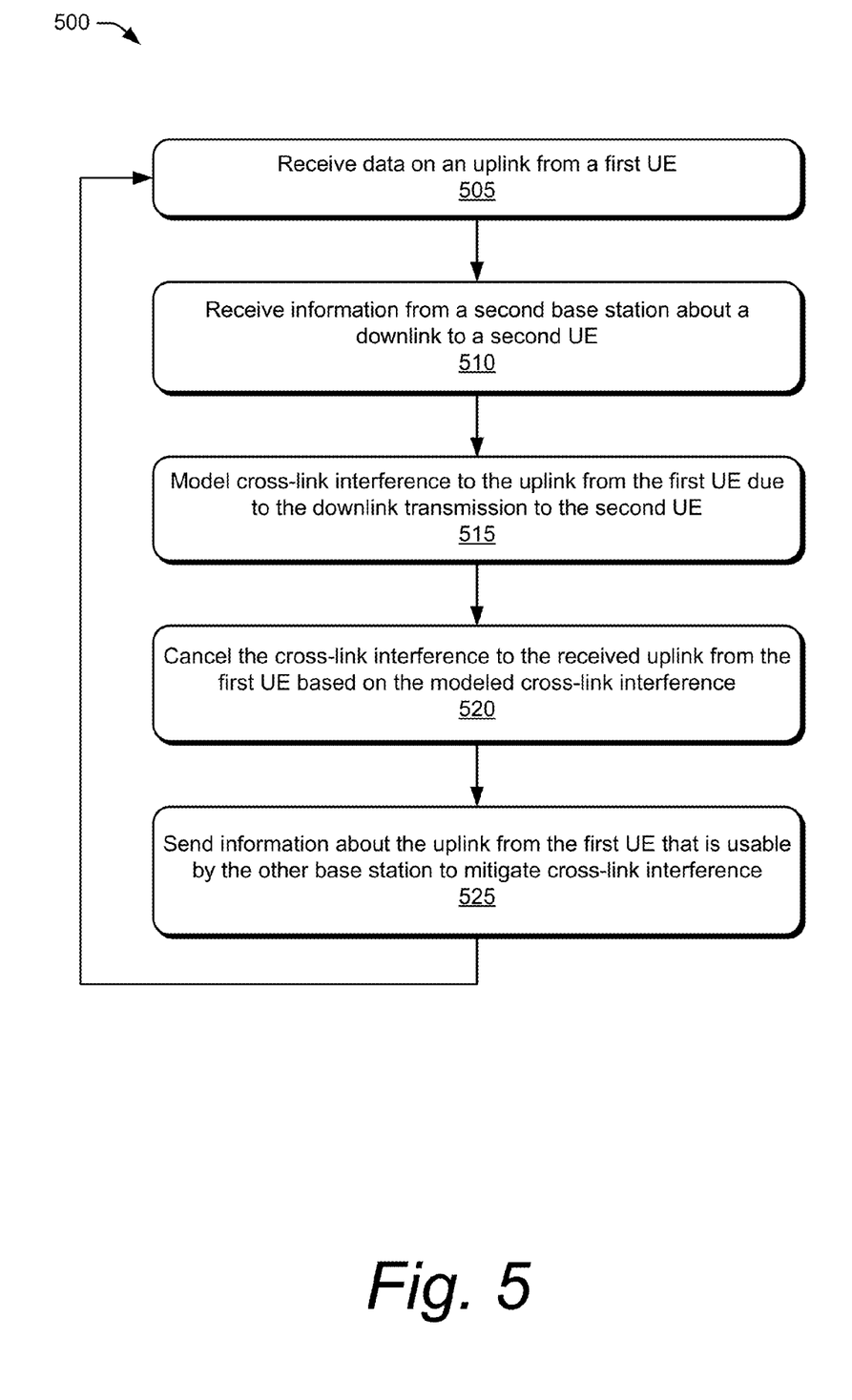
FIG. 5 illustrates an example process of base station coordination as generally related to a base station coordinating with another base station to cancel cross-link interference.

FIG. 5 illustrates an example process of base station coordination for interference cancellation as generally related to a base station coordinating with another base station to cancel cross-link interference. The base station in the example of FIG. 5 is the base station 121, as previously described. The base station 122, as previously described, is the other base station in the example of FIG. 5 communicating with the base station 121. The base station 121 may execute the operations 500 in a different order and with additional or fewer operations than as shown in FIG. 5. And, of course, more than two base stations may be involved and the uplinks and downlinks may change over time.

At 505, the base station receives data on an uplink from a first UE. For example, the base station 121 receives data on the uplink of the wireless link 131 from the UE 111.

At 510, the base station receives information from another base station about a downlink transmission from the other base station to a second UE. For example, using the Xn interface (link 106), the base station 121 receives, from the base station 122, I/Q data, scheduling data, beamforming configurations, or other information related to a downlink transmission by the base station 122 using the wireless link 132.

At 515, the base station models cross-link interference to the uplink from the first UE due to the downlink transmission by the other base station. For example, based on coordination information obtained from the base station 122, the base station 121 models cross-link interference 382 produced by the downlink transmission by the base station 122. The base station 121 can construct a filter and apply the filter to the received uplink of the wireless link 131 to cancel the cross-link interference 382 or change a beamforming configuration for reception of the uplink to cancel the cross-link interference 382.

At 520, the base station cancels the cross-link interference to the received uplink from the first UE based on the modeled cross-link interference. For example, the base station 121 can apply the filter constructed at 515 to cancel the cross-link interference 382 to the uplink signal received from the UE 111.

At 525, the base station sends information about the uplink transmission from the UE 111 that is usable by the other base station to mitigate the cross-link interference 381. For example, using the link 106, the base station 121 may transmit, to the base station 122, scheduling data, or other information indicative of the transmission from the UE 111, including location information associated with the UE 111 and/or transmit power associated with the UE 111. The base station 122 may coordinate with the base station 121 to jointly schedule air interface resources allocated to the wireless links 131 and 132 to mitigate the cross-link interference 382 to the uplink from the UE 111, and also to mitigate the cross-link interference 381 to the downlink reception of the wireless link 132 by the UE 112.

The base station 121 may repeat steps 505 through 525 throughout reception of the uplink transmissions from the UE 111. The base station 121 may repeat steps 505 through

525 periodically, on a schedule, or based on other criteria determined by an administrator. The base station 121 may perform operations 500 in response to the base station 121 and/or the base station 122 establishing new transmissions with other UEs that could potentially create additional cross-link interference. Also, the base station 122 may perform operations 500 when it is receiving an uplink from UE 112.

Generally, any of the components, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

EXAMPLES

Example 1: A method performed by a first base station (121) of a base-station coordination set (140) in coordination with a second base station (122) of the base-station coordination set (140) to cancel a cross-link interference (380), the method comprising: receiving, by the first base station (121) and from the second base station (122), information about a downlink transmission (132) from the second base station (122) to a second user equipment (112) that will occur at a future time; based on the information, modeling, by the first base station (121), the cross-link interference (380) expected at the first base station (121) from the downlink transmission (132) at the future time; generating, by the first base station (121) and based on the model, a cancelation filter configuration; and applying, by the first base station (121), the cancelation filter configuration to an uplink transmission (131) from a first user equipment (111) that is received at the future time.

Example 2: The method of example 1, wherein receiving the information about the downlink transmission includes: receiving I/Q information about the downlink transmission that will occur at the future time.

Example 3: The method of example 2, wherein generating the cancelation filter configuration comprises: constructing a filter based on the I/Q information about the downlink transmission that will occur at the future time.

Example 4: The method of any of examples 1 to 3, wherein receiving the information about the downlink transmission includes: receiving frequency and time scheduling information for air interface resources that will be allocated to the downlink transmission that will occur at the future time.

Example 5: The method of example 4, wherein generating the cancelation filter configuration comprises: constructing a filter based on the frequency and time scheduling information for air interface resources that will be allocated to the downlink transmission that will occur at the future time.

Example 6: The method of any of the preceding examples, wherein receiving the information about the downlink transmission includes: receiving a transmission beamforming configuration for the downlink transmission that will occur at the future time.

Example 7: The method of example 6, wherein generating the cancelation filter configuration comprises: constructing a reception beamforming configuration based on the transmission beamforming configuration for the downlink transmission that will occur at the future time.

Example 8: The method of example 7, wherein the applying the cancelation filter configuration to the uplink transmission comprises: applying the reception beamforming configuration to a receiver of the first base station prior to receiving the uplink transmission at the future time.

Example 9: The method of example 6, further comprising: sending, by the first base station, a request to the second base station to change the transmission beamforming configuration for the downlink transmission that will occur at the future time.

Example 10: The method of any of the preceding examples, wherein receiving the information about the downlink transmission comprises: receiving the information about the downlink transmission from the second base station using an Xn interface.

Example 11: The method of example 10, wherein the Xn interface is a wireless link.

Example 12: The method of example 11, wherein the wireless link is a millimeter wave link, a sub-millimeter wave link, or a free space optical link.

Example 13: The method of any of the preceding examples, wherein the modeling the cross-link interference switches from using a Gaussian interference estimation calculation to a non-Gaussian interference estimation calculation based on the information received about the downlink transmission that will occur at the future time.

Example 14: The method of any of the preceding examples, further comprising: based on the modeling of the cross-link interference, transmitting, by the first base station and to the second base station, a request to change a parameter of the downlink transmission that will occur at the future time; receiving, from the second base station, updated information about the downlink transmission that will occur at the future time; updating the model of cross-link interference expected at the first base station from the downlink transmission at the future time; and updating the cancelation filter configuration based on the updated model.

Example 15: A first base station comprising: a radio frequency receiver; an inter-base station interface; and a processor and memory system coupled to the radio frequency receiver and comprising instructions that are executable by the processor to configure the first base station to perform any of the methods of examples 1 to 14.

Example 16: A method performed by a second base station of a base-station coordination set to cancel cross-link interference in coordination with a first base station of the base-station coordination set, the method comprising: sending, by the second base station and to the first base station, information about a downlink transmission from the second base station to a second user equipment that will occur at a future time, the information about the downlink transmission at the future time being effective to allow the first base station to cancel cross-link interference from an uplink transmission from a first user equipment.

Example 17: The method of example 16, wherein the information about the downlink transmission at the future time includes I/Q samples for the downlink transmission at the future time.

Example 18: The method of example 16 or example 17, further comprising: receiving, from the first base station, a schedule of frequency and time resources for the uplink transmission to the second base station; and changing one or more scheduled time or frequency resources, in accordance with the received schedule, to cancel cross-link interference to the reception of the downlink by the second user equipment.

Example 19: The method of any of examples 16 to 18, further comprising: receiving, from the first base station, a beamforming configuration; changing a beamforming configuration of the second base station, in accordance with the received beamforming configuration; and performing a downlink transmission to the second user equipment using the changed beamforming configuration.

Example 20: A second base station comprising: a radio frequency receiver; an inter-base station interface; and a processor and memory system coupled to the radio frequency receiver and comprising instructions that are executable by the processor to configure the first base station to perform any of the methods of examples 16 to 19.

Example 21: A base station coordination set comprising: a first base station in accordance with example 15; and a second base station in accordance with example 20.

Example 22: A method performed by a base station coordination set, the method comprising: performing any of the methods of examples 1 to 14 at a first base station of the base station coordination set; and performing any of the methods of examples 16 to 19 at a second base station of the base station coordination set.

Example 23. A computer-readable storage medium comprising instructions that, when executed by a processor, cause an apparatus incorporating the processor to perform any of the methods of examples 1 to 14, examples 16 to 19, and/or example 22.

CONCLUSION

Although techniques and devices for enabling base station coordination to cancel cross-link interference have been described in language specific to features and/or methods, it is to be understood that the subject of the appended claims is not necessarily limited to the specific features or methods described. Rather, the specific features and methods are disclosed as example implementations for enabling base station coordination to cancel cross-link interference.

What is claimed is:

1. A method performed by a first base station of a base-station coordination set in coordination with a second base station of the base-station coordination set to cancel cross-link interference, the method comprising:
receiving, by the first base station and from the second base station, information about a future downlink transmission from the second base station to a second user equipment;
allocating, by the first base station and based on the information, air interface resources to an uplink transmission from a first user equipment to the first base station, the allocating determined to reduce a first cross-link interference to the future downlink transmission at the second user equipment caused by the uplink transmission;
modeling, by the first base station and based on the information, a second cross-link interference to the uplink transmission at the first base station caused by the future downlink transmission;
generating, by the first base station and based on the modeling, a cancelation filter configuration; and
applying, by the first base station, the cancelation filter configuration to the uplink transmission to reduce the second cross-link interference.

2. The method of claim 1, wherein the receiving the information about the future downlink transmission includes:
receiving in-phase and quadrature (I/Q) information about the future downlink transmission.

3. The method of claim 2, wherein the generating the cancelation filter configuration comprises:
constructing a filter based on the I/Q information about the future downlink transmission.

4. The method of claim 1, wherein the receiving the information about the future downlink transmission includes:
receiving an indication of air interface resources that are allocated to the future downlink transmission.

5. The method of claim 4, wherein the generating the cancelation filter configuration comprises:
constructing a filter based on the air interface resources that are allocated to the future downlink transmission.

6. The method of claim 1, wherein the receiving the information about the future downlink transmission includes:
receiving a transmission beamforming configuration for the future downlink transmission.

7. The method of claim 6, wherein the generating the cancelation filter configuration comprises:
constructing a reception beamforming configuration for the uplink transmission based on the transmission beamforming configuration for the future downlink transmission.

8. The method of claim 7, wherein the applying the cancelation filter configuration to the uplink transmission comprises:
applying the reception beamforming configuration to a receiver of the first base station.

9. The method of claim 6, further comprising:
sending, by the first base station and to the second base station, a request to change the transmission beamforming configuration for the future downlink transmission.

10. The method of claim 1, wherein the receiving the information about the future downlink transmission comprises:
receiving the information about the future downlink transmission from the second base station using an Xn interface.

11. The method of claim 10, wherein the receiving the information about the future downlink transmission further comprises:
receiving the information about the future downlink transmission from the second base station using a wireless link.

12. The method of claim 11, wherein the receiving the information about the future downlink transmission further comprises:
receiving the information about the future downlink transmission from the second base station using a millimeter wave link, a sub-millimeter wave link, or a free space optical link.

13. The method of claim 1, wherein the modeling the second cross-link interference comprises:

selecting a Gaussian interference estimation calculation or a non-Gaussian interference estimation calculation based on the information received about the future downlink transmission.

14. The method of claim 1, further comprising:
transmitting, by the first base station and to the second base station, a request to change at least one parameter of the future downlink transmission, the request based on the modeling of the second cross-link interference;
receiving, by the first base station and from the second base station, updated information about the future downlink transmission;
updating, by the first base station and based on the updated information, the modeling of the second cross-link interference; and
updating, by the first base station, the cancelation filter configuration based on the updated modeling.

15. A first base station comprising:
an inter-base station interface;
at least one processor; and
a memory system comprising instructions that are executable by the processor to configure the first base station to:
receive, from a second base station and over the inter-base station interface, information about a future downlink transmission from the second base station to a second user equipment;
allocate, based on the information, air interface resources to an uplink transmission from a first user equipment to the first base station, the allocation determined to reduce a first cross-link interference to the future downlink transmission at the second user equipment caused by the uplink transmission;
model, based on the information, a second cross-link interference to the uplink transmission at the first base station caused by the future downlink transmission;
generate, based on the modeling, a cancelation filter configuration; and
apply, by the first base station, the cancelation filter configuration to the uplink transmission to reduce the second cross-link interference.

16. The first base station of claim 15, wherein:
the information about the future downlink transmission includes in-phase and quadrature (I/Q) information about the future downlink transmission; and
the cancelation filter configuration comprises a filter based on the I/Q information about the future downlink transmission.

17. The first base station of claim 15, wherein the information about the future downlink transmission includes an indication of air interface resources that are allocated to the future downlink transmission.

18. The first base station of claim 15, wherein:
the information about the future downlink transmission includes a transmission beamforming configuration for the future downlink transmission; and
the cancelation filter configuration comprises a reception beamforming configuration for the uplink transmission based on the transmission beamforming configuration for the future downlink transmission.

19. The first base station of claim 15, wherein the inter-base station interface comprises a wired or wireless Xn interface.

20. The first base station of claim 15, wherein the modeling the second cross-link interference comprises:
selecting a Gaussian interference estimation calculation or a non-Gaussian interference estimation calculation based on the information received about the future downlink transmission.

\* \* \* \* \*